United States Patent [19]
Olander et al.

[11] Patent Number: 5,976,293
[45] Date of Patent: Nov. 2, 1999

[54] METHOD FOR MAKING A CASE FOR COMBUSTIBLE MATERIALS

[75] Inventors: Donald E. Olander, Tempe, Ariz.; James Campbell, South Lake Tahoe, Calif.

[73] Assignee: Universal Propulsion Company, Inc., Phoenix, Ariz.

[21] Appl. No.: 08/798,456

[22] Filed: Feb. 10, 1997

[51] Int. Cl.⁶ .................................................. B65H 81/00
[52] U.S. Cl. .......................... 156/172; 60/253; 102/481; 156/169; 156/173; 156/175
[58] Field of Search ............... 102/481; 60/253; 156/169, 172, 173, 175

[56] References Cited

U.S. PATENT DOCUMENTS

| | | |
|---|---|---|
| H1144 | 3/1993 | Cherry et al. . |
| 2,995,011 | 8/1961 | Kimmel . |
| 3,316,842 | 5/1967 | Schulz . |
| 3,745,927 | 7/1973 | Tanner et al. . |
| 3,872,205 | 3/1975 | Ratte et al. . |
| 3,879,243 | 4/1975 | Medney . |
| 3,943,208 | 3/1976 | Ratte et al. . |
| 4,470,860 | 9/1984 | Gill et al. ................................ 156/175 |
| 4,822,832 | 4/1989 | Chu et al. ................................ 523/423 |
| 4,892,764 | 1/1990 | Drain et al. . |
| 5,035,756 | 7/1991 | Covino . |
| 5,060,470 | 10/1991 | Van Name . |
| 5,170,007 | 12/1992 | Figge, Sr. . |
| 5,228,285 | 7/1993 | Van Name et al. . |
| 5,311,820 | 5/1994 | Ellingsen . |
| 5,341,638 | 8/1994 | Van Name et al. . |
| 5,369,955 | 12/1994 | Van Name et al. . |
| 5,388,399 | 2/1995 | Figge et al. . |
| 5,398,498 | 3/1995 | Mort et al. . |

FOREIGN PATENT DOCUMENTS

0 323 247   7/1989   European Pat. Off. .

*Primary Examiner*—Jeff H. Aftergut
*Attorney, Agent, or Firm*—Pennie & Edmonds LLP

[57] ABSTRACT

A dimensionally stable case for supporting and controllably combusting propellant and/or gas-generant combustion gases is disclosed. The case is permeable to the combustion gases produced at temperatures above ambient temperature but below the auto-ignition temperature of the propellant and/or gas-generant supported therein. Further, the case is dimensionally stable without the use of metals, alloys or the like that yield shrapnel upon explosion in the barrel section of the case. Thus, an Insensitive Munitions case capable of passing cook-off tests is provided.

27 Claims, 7 Drawing Sheets

METHOD FOR MAKING A CASE FOR COMBUSTIBLE MATERIALS

FIELD OF THE INVENTION

The present invention is directed to an article of manufacture adapted for use as a case for a combustible material such as a propellant or a gas-generant. More particularly, the present invention is directed to a high-strength case which is permeable to propellant or gas-generant combustion gases produced at temperatures above ambient temperature and below the auto-ignition temperature of the propellant or gas-generant and to methods for making and using the same.

BACKGROUND OF THE INVENTION

Combustible materials useful as propellants or gas-generants are provided for a variety of applications. These applications include, but are not limited to, in the case of propellants, supplying the propulsive energy required to propel a rocket and, in the case of gas generants, supplying sufficient combustion gases, for example, to inflate a vehicle air-bag in the event of a collision. The propellant or gas-generant is typically located within a protective outer case.

While the propellant or gas-generant is maintained in storage or being transported, for example, prior to deployment of a rocket or while an air-bag remains undeployed, it is critically important to avoid where possible, or to at least minimize the effects of, unintended combustion and/or explosion of the combustible material. Prior to deployment, the propellant and/or the gas-generant composition within the case may be exposed to a variety of stimuli such as to extremes of temperature from fire or other localized or dispersed heat sources, varying humidity levels, exposure to incoming artillery including shrapnel, bullets and the like in a variety of environments wherein, e.g., rockets and/or air-bags have utility. In response to such stimuli, due to the explosive nature of these compositions, unintended combustion and explosion of propellants and/or gas-generants can occur causing catastrophic damage to life and/or to property.

Most often, just prior to explosion, the case in which a propellant and/or a gas-generant composition is located becomes highly pressurized. Such pressurization induces the case to violently explode, causing potentially catastrophic consequences. If the case itself or any substantial part thereof is enclosed within or substantially encloses materials such as metals, alloys and the like that may yield shrapnel, the extent of damage caused by the explosive force of the propellant and/or gas-generant within the case is exponentially increased.

To avoid or at least minimize the consequences of unintended combustion and explosion of the combustible material, it is desirable to provide a case that will not violently explode in response to exposure of the material therein to a variety of unforseen stimuli. Thus, there is a need to provide a case which minimizes the tendency to pressurize and then explode. Such a case, in the event of an explosion, would minimize or preferably eliminate the tendency to yield shrapnel while retaining its dimensional stability. Dimensional stability, as used herein, refers to a case having sufficient hoop and longitudinal load for either propulsive and/or gas-generant applications and is further defined below. Such a case would provide the advantage of minimizing or altogether eliminating the potential danger, for example, from an exploding rocket while in storage or in transport or from a vehicle air-bag whose deployment is initiated by an intervening cause such as a fire involving the vehicle in which the air bag is installed.

One approach to providing such a case is to form one which is permeable to combustion gases when the case is subjected to temperatures above the ambient temperature but below the auto-ignition temperature of the combustible material, e.g., the propellant and/or gas-generant contained therein. It is further desirable to form the case from materials that eliminate or minimize the use of materials such as metals, various alloys, or other similar materials that may yield shrapnel upon explosion. It is, therefore, desirable to eliminate or at least minimize the inclusion of such materials either within the case itself, substantially surrounding the case or being substantially surrounded by the case. Avoidance of or the minimal use of such materials thus reduces the potential for and extent of damage to property or injury to persons in the vicinity of an explosion typically occurring under unintended or uncontrolled circumstances.

Figure 7:
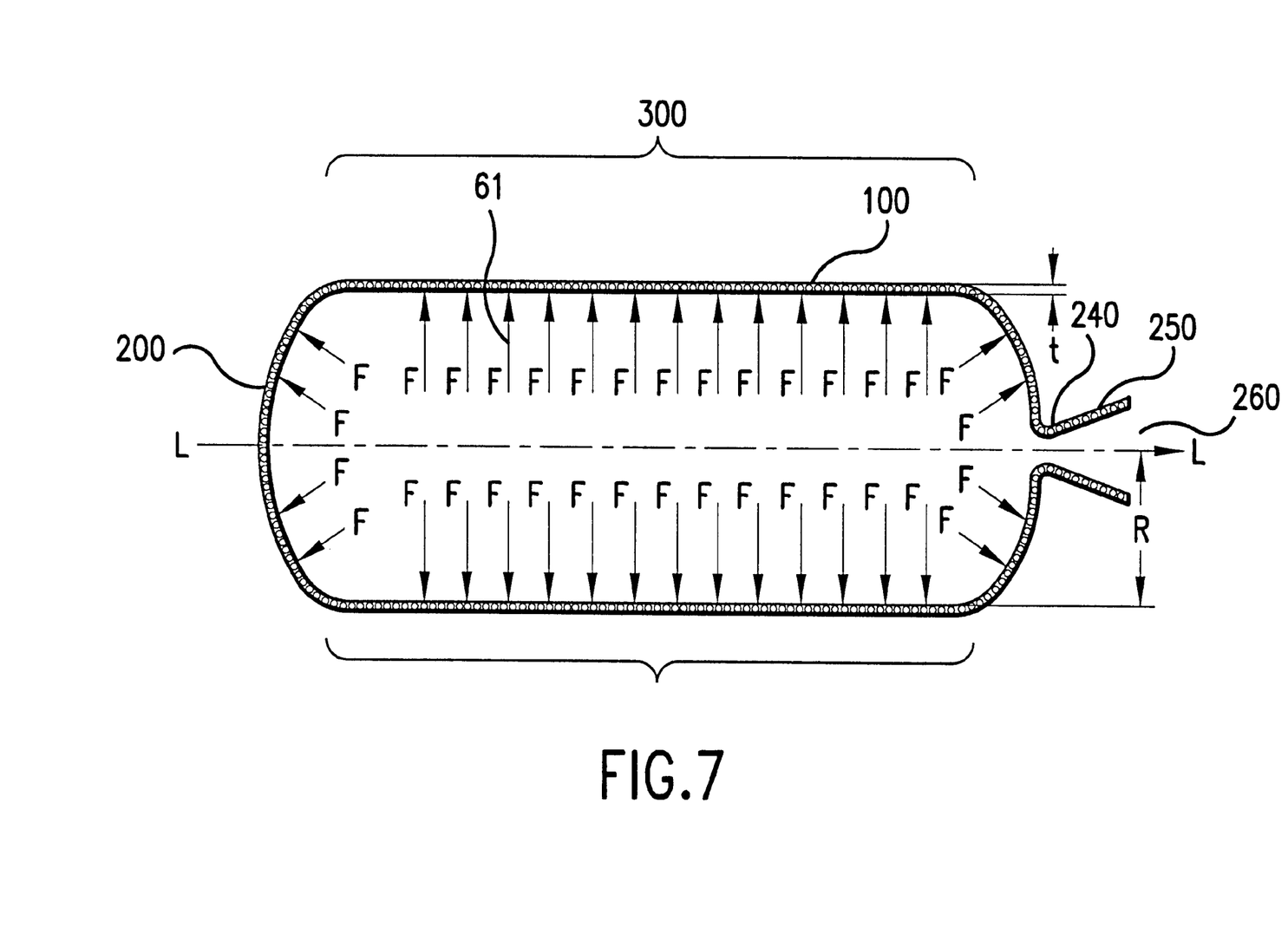
FIG. 7 is a sectional view of a case depicting hoop forces being applied against the inner surface of a case having a thickness t and a radius R.

U.S. Pat. Nos.: 5,228,285; 5,060,470; and 5,369,955 are noted as examples of attempts to provide a case such as that described above. However, all of these patents disclose cases that are plagued by one or more critical 1s deficiencies. For example, in the '285 patent, a case comprising a slotted and capped metal sleeve overwrapped with fibers coated with a matrix resin is disclosed. The presence of the metal sleeve (see column 4, lines 25–27 of the '285 patent) in the barrel of the case is required to provide the necessary longitudinal load. The "longitudinal load", as the term implies, refers to the resistance provided by the case in response to the force longitudinally exerted thereon along its major longitudinal axis, L, upon controlled combustion of the combustible material. See FIG. 7, infra. The overwrap provides the necessary hoop load. The "hoop load" refers to the resistance provided by the case in response to the force radially exerted by controlled combustion of the combustible material thereon. Hoop forces are denoted by the radially directed arrows marked F in FIG. 7.

The term "dimensional stability" as used herein is defined as providing sufficient longitudinal and hoop loads for propulsive and/or gas-generating applications and the like. If sufficient hoop load and/or longitudinal load is not provided by the case, it will break up during the controlled combustion of the propellant and/or gas-generant contained therein to the degree that, for example, the rocket will not reach its target or the air-bag will not properly deploy. The case of the '285 patent, as noted above, requires the use of substantial amounts of metal in the barrel section which can form extremely destructive shrapnel upon explosion. As such, the case of '285 fails to fill the aforementioned need.

Likewise, the '470 patent relies on the use of memory metal members (item 26 of FIG. 2 depicted in the '470 patent) to provide a gas permeable case. Again, as with the '285 patent, the memory metal itself can form extremely destructive shrapnel upon explosion. As such, the case of the '470 patent also fails to fill the aforementioned need.

The '955 patent relies on the use of a case 12 (See FIG. 1 therein) comprising a fibrous material impregnated with a matrix material. The matrix material comprises first and second resin components. According to the '955 patent, the first resin component is any suitable resin which under actinic radiation conditions may be cured to immobilize the mass of the first resin without simultaneously curing the second resin component. The use of an actinic radiation curable material requires the use of cumbersome radiation curing equipment and further limits the choice of the first resin to one that is curable by exposure to such radiation and which cures under curing conditions different than those of the second resin. Use of such first and second resins and their peculiar curing requirements thus introduce unnecessary and undesirable limitations and complications in the formation of a case as described and sought.

Further, according to the '955 patent, the case described therein relies on the use of fibrous material that weakens as the melt point of the fiber is approached. See column 3, lines 30–43 of the '955 patent. Examples of such fibrous materials are polyolefin fibers (Spectra® 1000) or polyethylene fibers (Spectra® 900) as noted in the '955 patent at column 3, lines 46 and 56, respectively. Further, as also noted in the '955 patent, these fibers have melting points between 200° F. to 300° F., which are intermediate between the ambient temperature (up to 165° F.) and the auto-ignition temperature (of 400° F.) described therein. The use of such fibers, having melting points between 200° F. to 300° F., undesirably and disadvantageously limits the temperature at which the first and second resins may be cured. See column 4, lines 6–8 of the '955 patent. In particular, to maintain fiber integrity, the first and second resins cannot be cured above about 200° F. Additionally, the low melting points in the range of 200–300° F. of such fibers limit their use. For example, double base propellants have an auto-ignition temperature of only 320° F. The close proximity of the auto-ignition temperature and the melting point temperatures of the fibers (of the '955 patent) prohibitively restricts their use to propellants and/or gas-generants having auto-ignition temperatures substantially higher than 320° F. If high melting point-fibers could be used such limitations would be entirely avoided.

Further, U.S. Pat. No. 4,892,764 to Drain et al. discloses a filament reinforced resin composite article serving as a pressure vessel. See column 1, line 62 of the '764 patent. According to the '764 patent, the filament includes materials such as glasses, graphite, boron, Kevlar®, polyacetal and more generally, wood, metal, natural and synthetic polymers, etc. See column 17, lines 35–38 of the '764 patent. Further according to the '764 patent, the resins employed in filament winding must exhibit constant viscosity and long pot life to avoid sagging and to maintain uniform thickness during the filament winding process. As noted at columns 3 and 4 of the subject patent, the resin compounds are first and second epoxy resins identical to those described in the '955 patent. Thus, the unnecessary complexity introduced by the use of actinic radiation curable resins previously noted with the '955 patent equally apply to the '764 patent.

The major design flaw of the articles made according to the '764 patent is that the '764 patent is directed to forming "pressure vessels". Such vessels, as the term implies, are directed to maintaining and containing any pressure build-up that may occur during the combustion of a propellant and/or a gas-generant. In effect, the articles of the '764 patent are directed to being impermeable to propellant and/or gas-generant combustion gases. In fact, no mention of an article having permeability to combustion gases produced at temperatures above ambient temperature but below the auto-ignition temperature of the combustible material is made in the '764 patent.

Thus, the need to provide a case which is substantially free of metal or similar materials capable of forming dangerous shrapnel, which uses fibers having melting points above about 300° F., preferably, well above about 300° F., which is permeable to combustion gases above ambient temperature but below the auto-ignition temperature of a propellant, gas-generant or other combustible material contained therein while retaining its dimensional stability while in use remains unfulfilled.

SUMMARY OF THE INVENTION

It is therefore an object of the present invention to provide a case for propellants and/or gas-generants that has dimensional stability for its intended use, that minimizes or eliminates the use of metals, that is permeable to combustion gases at a temperature above ambient temperature and below the auto-ignition temperature of the propellant and/or gas-generant provided therein sufficient to prevent catastrophic explosion of the case and that uses fibers having melting points above 300° F. It is a further object to provide methods for making such a case and using the same.

These and other objects are accomplished by a case for combustible materials which comprises:

a layer of at least one fiber having a preselected melting point, and matrix material having a preselected softening point and which is at least partially cured, the layer being configured in the desired shape of the case and defining an interior cavity for receiving combustible material, with the preselected softening point of the matrix material being lower than the preselected melting point of the fiber, wherein the layer has sufficient dimensional stability to maintain the desired shape of the case while supporting and retaining combustible material therein, with the softening point of the matrix material being lower than the auto-ignition temperature of the combustible material that is to be placed in the cavity.

It is noted that such a case is dimensionally stable.

The case is made by the process denoted below. A process for forming a case for combustible materials which comprises the steps of:

associating a matrix material that has a preselected softening point with at least one fiber having a preselected melting point to form a coated fiber, with the preselected softening point of the matrix material being lower than the preselected melting point of the fiber;

arranging the coated fiber to form a layer of fiber and matrix material in the desired shape of the casing, with the layer defining an interior cavity for receiving combustible material;

at least partially curing the matrix material of the layer;

subsequently heating the at least partially cured layer to a heating temperature above the softening point of the matrix material for a heating time sufficient to impart dimensional stability to the layer so that the layer can maintain the desired shape of the casing while supporting and retaining combustible material therein, with the softening point of the matrix material is lower than the auto-ignition temperature of the combustible material that is to be placed in the cavity; and cooling the heated layer to obtain the casing.

It is noted that the dimensionally stable case of the present invention is permeable to propellant and/or gas generant combustion gases above ambient temperature and below the auto-ignition temperature of the propellant and/or gas-generant provided therein. Further the case of the present invention is essentially free of a metal, alloys or other similar materials in the barrel section of the case. Lastly, the process step of heating above the softening point of the matrix material yields a dimensionally stable case.

DETAILED DESCRIPTION OF THE PREFERRED EMBODIMENTS

Figures 1, 2, 3:
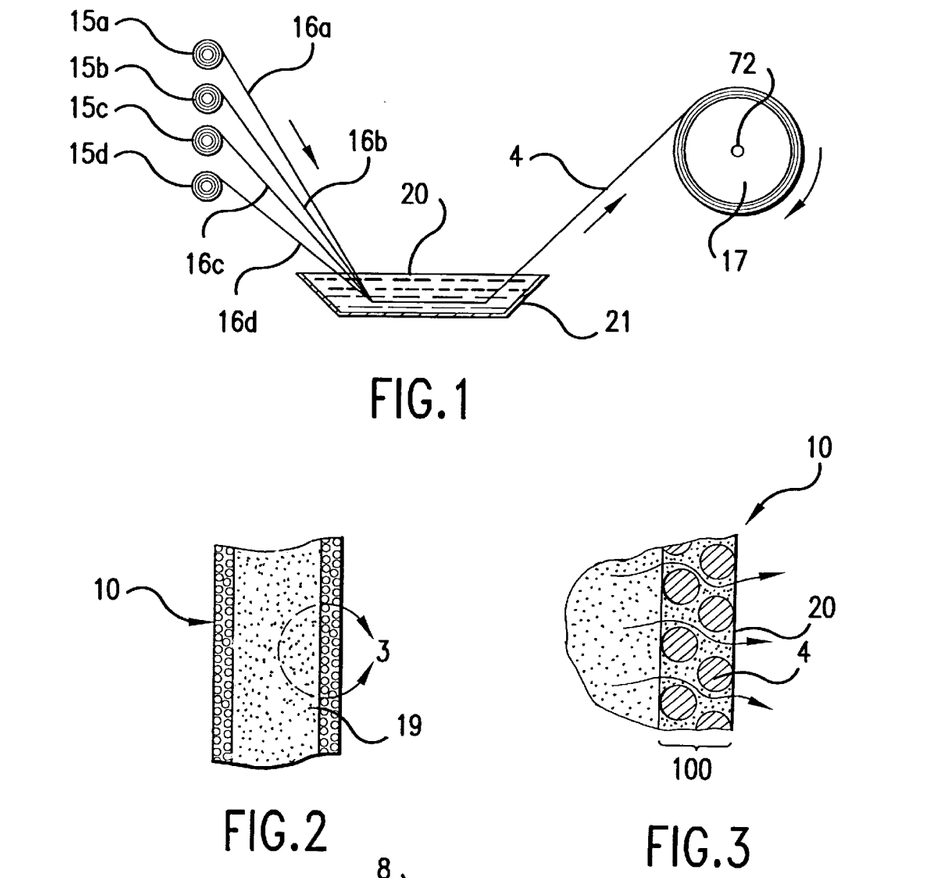
FIG. 1 is a schematic view illustrating a process for making the case of FIGS. 2–8 in accordance with one embodiment of the present invention.
FIG. 2 is a sectional view of the case of FIG. 1 showing one embodiment of the case containing a combustible material.
FIG. 3 is an enlarged view of the fragmentary section of FIG. 2 as indicated by the dashed circular arrow and numeral 3.
Figure 9:
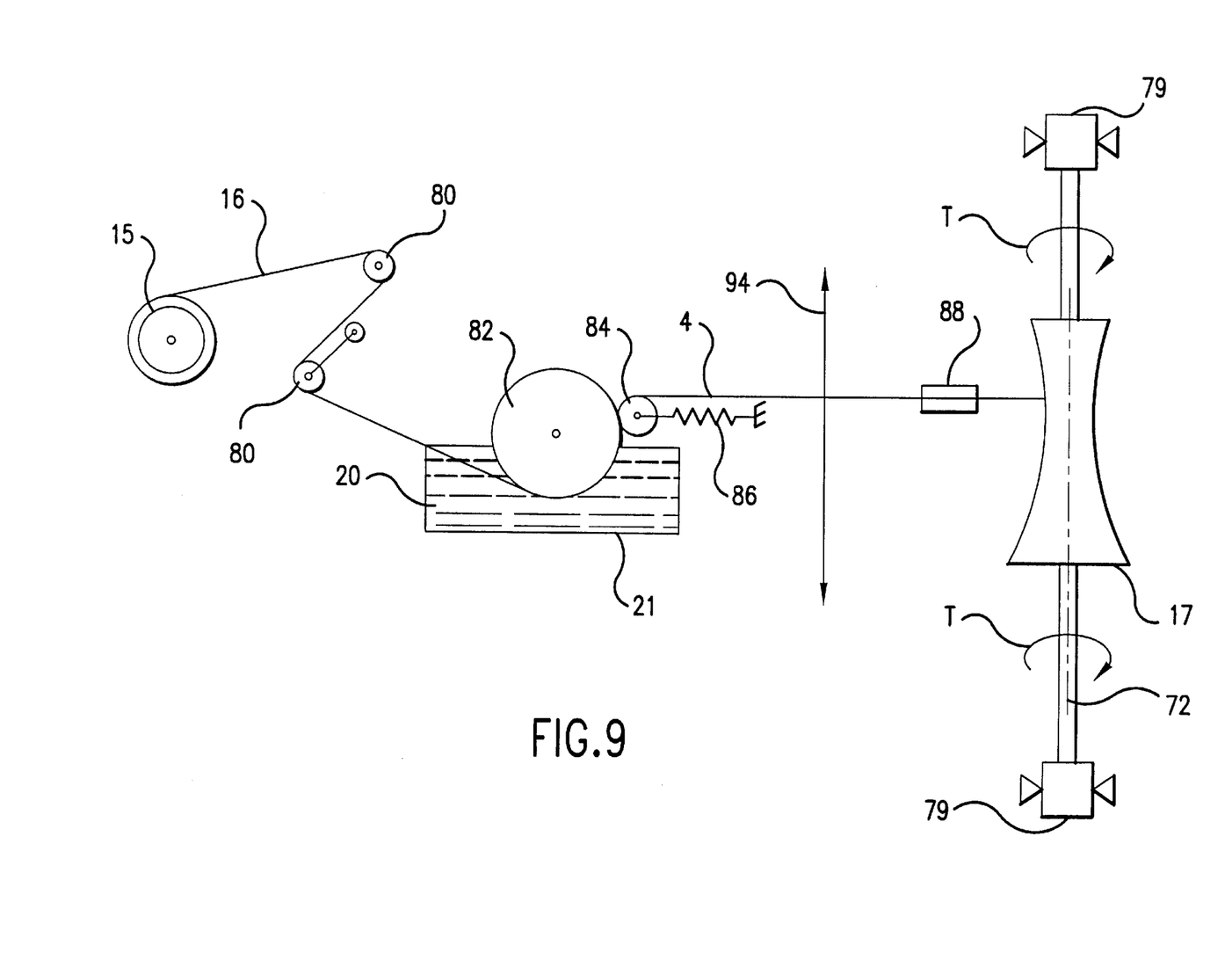
FIG. 9 is a schematic view illustrating a process for making the case of FIGS. 2–8 in accordance with another embodiment of the present invention.
Figure 10:
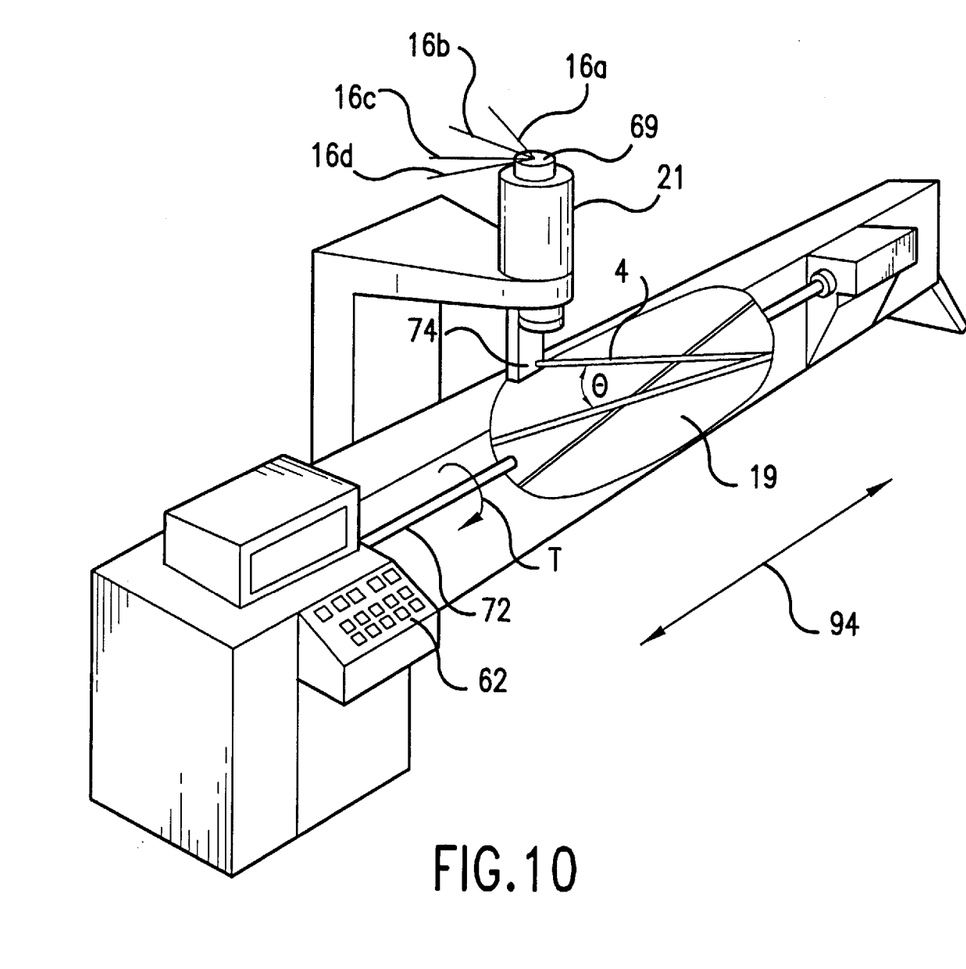
FIG. 10 is a schematic view illustrating a process for making the case of FIGS. 2–8 in accordance with yet another embodiment of the present invention.

In accordance with the present invention, a dimensionally stable case is made as schematically depicted in FIGS. 1, 9 and 10. The processes depicted in these figures generally involve: (a) providing a fiber 16 or alternately a multiplicity of fibers, such as, 16a, 16b, 16c and 16d having a melting point; (b) providing a matrix material 20 having a softening point below the melting point, for example, in a matrix bath 21 for encasing the fiber(s); (c) encasing the fiber(s) in the matrix material 20; (d) winding the encased fiber(s) 4 to form any desired shape around, for example, a mandrel 17 or a shaped body 19 which is held, for example, by shaft 72; (e) at least partially curing the matrix material at a curing temperature for a curing time; (f) then heating the matrix material 20 to a temperature which is above the softening point temperature of the matrix material 20 to impart dimensional stability to the case so formed; (g) optionally cooling the case (not shown); and (h) optionally, removing (not shown) any flashing from the case. As used herein, the term "softening point" is a temperature at which the matrix material becomes sufficiently permeable to permit combustion gases to pass from the interior of the case to its exterior. Such permeability eliminates or substantially reduces the potential for the case to explode due to internal pressurization from combustion gases. Further, as used herein, the term "encase" is considered to mean substantially covering the outer surface of the fibers while also including optional migration of the matrix material into the body of the fiber itself. As noted, the case so made is permeable, at a temperature intermediate ambient temperature and below the auto-ignition temperature of a propellant and/or a gas-generant, to combustion gases produced by the combustible material contained within the case.

In FIGS. 1 and 10, 16a, 16b, 16c and 16d are a multiplicity of fibers which may themselves comprise one or more fibers and which may be in the form, for example, of braided or woven fibers or may be in the form of a flat tape. Various fiber thickness and cross-sectional shapes as are known in the art are contemplated for use in accordance with the present invention. In the case of the present invention, the preferred fiber thickness ranges from about 0.01 to about 0.03 inches. Moreover, the thickness of the case wall is preferably at least about 0.07 inches. In FIGS. 1 and 9, the fiber(s) are conveniently supplied, for example, from spools 15, 15a, 15b, 15c and/or 15d. However, the fibers may be provided from any convenient source well known to those skilled in the art.

Fibers suitable for use in conjunction with the present invention include but are not limited to those formed from materials such as graphite, carbon, glass, silica, fiberglass, polyaramide (e.g., Kevlar®) or quartz. One or more fibers formed of the same or different materials may be combined before being encased in the matrix material.

Figure 8:
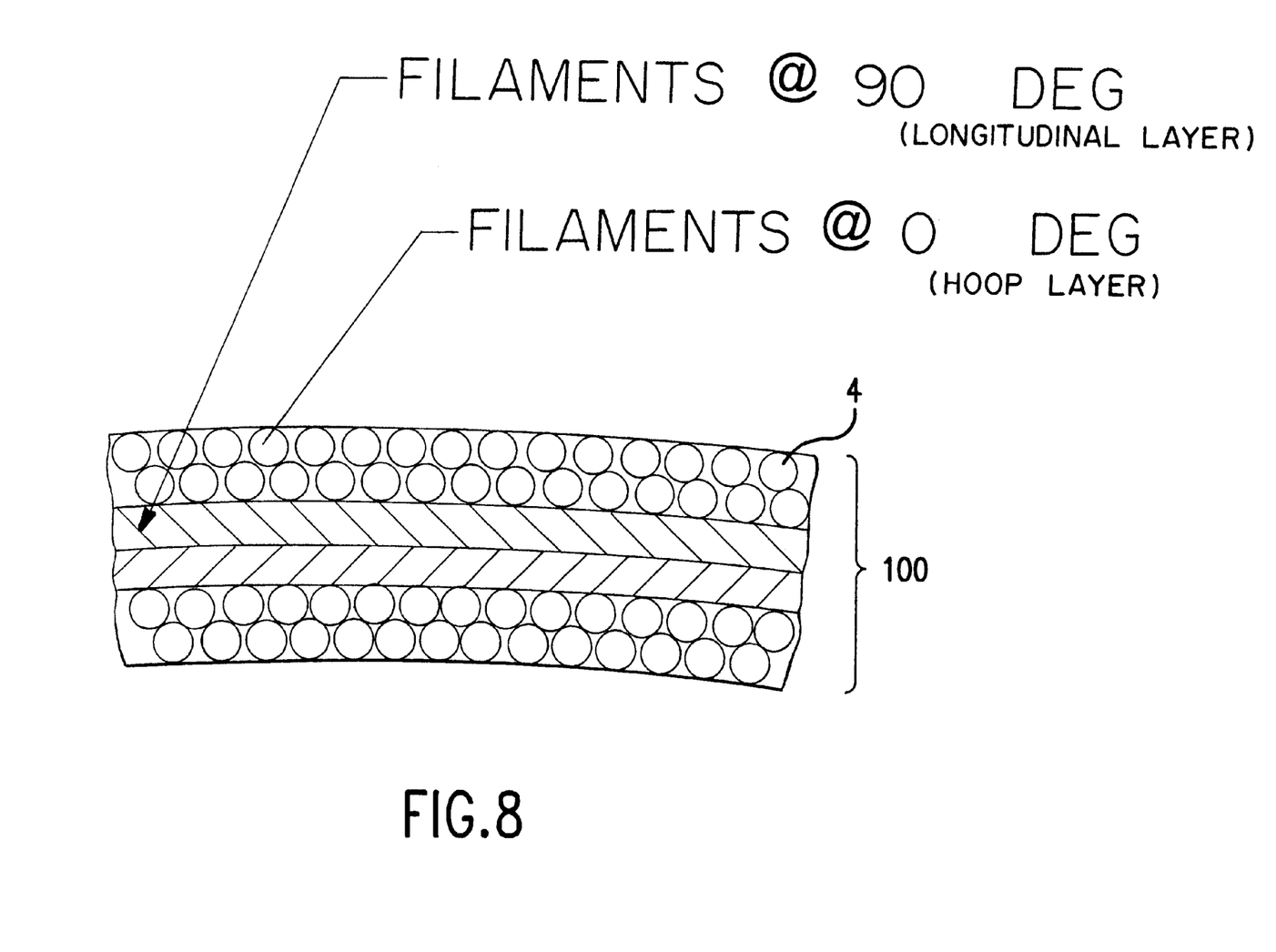
FIG. 8 is a close-up sectional view of a case made in accordance with another embodiment of the present invention depicting orthogonally oriented fibers.

In order to produce a case according to the present invention, a fiber material capable of imparting dimensional stability must be used. The fibers must have a melting point above 300° F. to provide sufficient strength and for greater utility with a wider range of propellants and/or gas-generants in order to impart the desired dimensional stability. Further, the fiber(s) must be wound at least at an angle $\Theta$ between the hoop layer(s) and the longitudinal layer(s) which is sufficient to provide the dimensional stability sought. It is preferred, although not required, that the case be formed with at least one hoop layer and at least one longitudinal layer. It is more preferred to form a case with at least two hoop layers and one longitudinal layer. In one embodiment, the fibers of one layer are at an angle $\Theta$ to the fibers of the other layer. For example, angle $\Theta$ in FIG. 8 is shown such that fiber(s) are wrapped in orthogonal directions to one another. However, the angle $\Theta$ may be varied from 90° as is depicted in FIG. 10. By the combination of winding at angle $\Theta$ and of using fiber(s) having a melting point above 300° F. (e.g., excluding, for instance, low melting polyolefin fibers), the case produced has sufficient dimensional stability for propulsive and gas-generant applications without reliance upon metal sleeves, memory metal members and the like and has utility with a broad range of propellants. Fibers having melting points above 300° F. that are compatible with the present invention include those formed of for example, glass, quartz, silica, and graphite/carbon which have melting points of about 1290° F., 2100° F., 2700° F. and >6300° F. respectively. Winding, preferably continuous winding, at an angle $\Theta$ can be achieved by several methods. For example, referring to FIG. 10, fibers 16a, 16b, 16c and 16d are fed into orifice 69, through matrix bath 21 containing matrix material 20 and exited at orifice 74 wherein the combined encased fibers 4 are wound about shaped body 19. During winding, shaft 72 is rotated, for example, in direction T. Shaped body 19 may also optionally be oscillated on shaft 72 along directions 94. In FIG. 10, the movement of shaped body 19 and rotation of shaft 72 is controlled by controller 62. Controller 62 determines the rotational speed and the rotational direction of shaft 72 as well as the carriage movement of shaped body 19 in directions 94. Thereby, angle $\Theta$ is readily adjusted to a desired value in a manner well known in the art.

In another embodiment, as depicted in FIG. 9, fiber 16 is fed under tension around tensioning devices 80 and under a suitable roll 82 into matrix material 20 contained in matrix bath 21. Thereafter, the encased fiber 4 still under tension provided by tension device 86 fitted to roll 84 is fed to a suitable conventional delivery head 88 from which fiber 4 is applied onto mandrel 17 provided on shaft 72, both being rotated in direction T. During winding, according to the embodiment of FIG. 9, the mandrel 17, the delivery head 88 or both can be oscillated in directions 94 to provide winding of the encased fiber 4 over mandrel 17 at any desired angle $\Theta$.

Typically, the angle Θ is varied from about 5° to about 90°, preferably, from about 45° to about 90° and, most preferably, from about 75° to about 90°. In FIG. 9, shaft 72 is mounted between suitable supports 79. Other methods of winding encased fibers at a desired angle Θ that are well known to those skilled in the art may be used.

Figure 4:
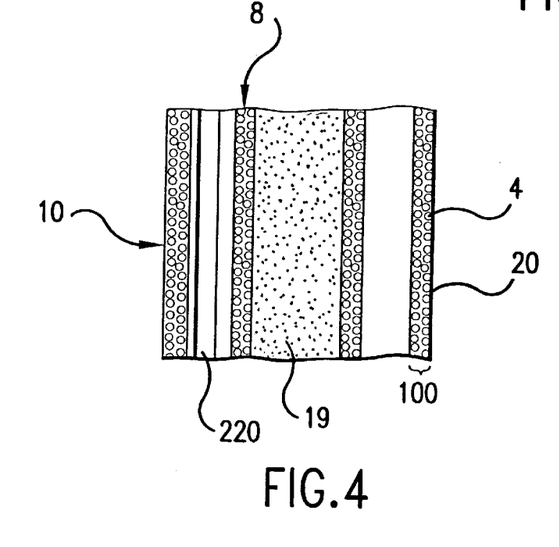
FIG. 4 is a sectional view of another embodiment of a case made in accordance with the present invention wherein an intermediate layer 8 and a cavity 220 are depicted.
Figure 5:
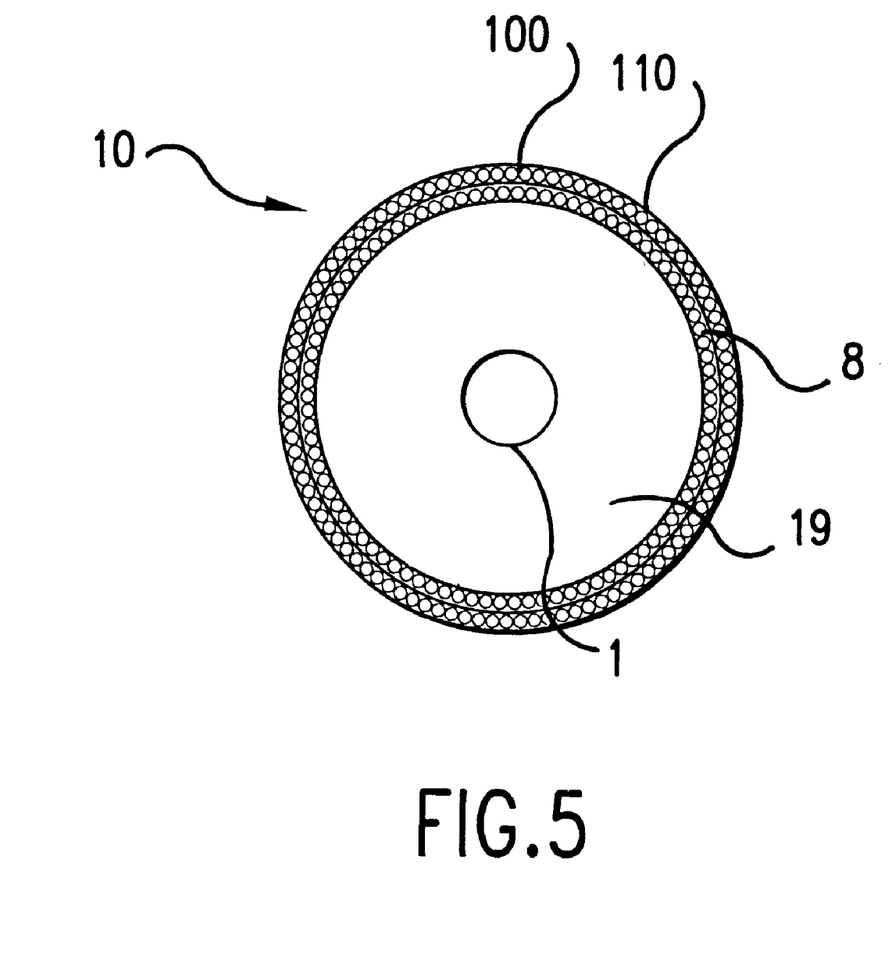
FIG. 5 is a cross-sectional view of another embodiment of a case made in accordance with the present invention.

Shaped body 19, for example of FIG. 10, may be an inert body such as a balloon which can be readily deflated and readily removed after completion of the winding operation. Alternatively, shaped body 19, for example of FIGS. 2–8, may be a solid combustible material such as a propellant intended to be enclosed by the case formed by winding encased fibers 4 thereon. The shaped body 19, such as a solid propellant or gas-generant may contain one or more insulating layers (not shown) and/or one or more liner layers (not shown) thereon. Typically, however, a layer of wound encased fibers is positioned directly adjacent to the propellant and/or gas-generant contained within the case so formed. The term "directly adjacent" as used herein is defined to mean that there are no intervening metallic structures between the case layer and the propellant. However, a non-metallic intermediate layer (for example, layer 8 of FIGS. 4, 5 or 6 which may serve as an insulating layer) may be interposed between the propellant and/or gas-generant and the case layer 100.

The propellant or gas-generant is any solid or liquid combustible material having an auto-ignition temperature. The auto-ignition temperature is a temperature at or above which the propellant and/or gas-generate will spontaneously ignite and then combust. For example, double base propellants have an auto-ignition temperature of about 320° F. Ammonium nitrate (AN) has an auto-ignition temperature of about 360° F. Ammonium perchlorate (AP) has an auto-ignition temperature of about 420° F. Potassium perchlorate has an auto-ignition temperature of about 500° F. Ignition and combustion of the flame front at or above auto-ignition temperature is considered controlled combustion of the combustible material. Whereas, ignition, combustion and/or explosion below the auto-ignition temperature is considered uncontrolled combustion in response to unforeseen stimuli.

Still further, pure AN begins to decompose with evolution of gas at 410° F. Prior to ignition of pure AN or a propellant containing AN, the AN must at least melt. As a result, AN propellants ignite slowly. Normally ammonium nitrate (AN) propellants auto-ignite at about 360–380° F. Nitroplasticizers, however, upon exposure to ignition energy, burn rapidly or detonate. Nitroplasticizers begin to produce significant amounts of gas starting at about 370° F.

Various propellants and/or gas generants may be used with the case of the present invention. Examples of suitable combustible materials compatible with the case of the present invention include a mixture of polyglycol adipate, nitroplasticizers and ammonium nitrate, a mixture of hydroxy terminated polybutadiene (HTPB) and ammonium perchlorate, a mixture of ammonium perchlorate and potassium perchlorate and a mixture of cellulose acetate, RDX and/or HMX and ammonium nitrate. The ammonium nitrate in the latter mixture may be age-stabilized and/or strengthened as described in U.S. application Ser. No. 08/753,521.

Other suitable materials include, but are not limited to, nitrate esters, nitramines, inorganic explosives, double base propellants, nitroplasticizers or mixtures thereof. Examples of nitrate ester propellants and/or gas-generants compatible for use as combustible materials in conjunction with the present invention include, but are not limited to, methyl nitrate, nitroglycerine, nitroglycol, erythritol tetranitrate, mannitol hexanitrate, entaerythritol tetranitrate, pentaerythritol trinitrate or ixtures thereof. Examples of nitramine propellants and/or gas-generants compatible for use as combustible materials in conjunction with the present invention include, but are not limited to, ethylenedinitramine, nitroguanidine, nitrourea, cyclo-1,3,5-trimethylene-2,4,6-trinitramine, cyclotetramethylene tetranitramine, tetranitroglycolurile or mixtures thereof. Examples of inorganic explosive propellants and/or gas-generants compatible for use as combustible materials in conjunction with the present invention include, but are not limited to, ammonium nitrate, potassium nitrate, ammonium perchlorate, potassium perchlorate, mercury fulminate, lead azide, silver azide or mixtures thereof. As one of ordinary skill in the art would recognize, however, the combustible materials useful in conjunction with the case of the present invention may be essentially any other propellants and/or gas-generants known in the art. Further, as is also well known, the combustible materials within the case may further contain additives such as binders, age-stabilizers, strengthening agents and the like. A variety of suitable propellant compositions are described in U.S. application Ser. No. 08/753, 521, incorporated herein by reference in its entirety.

In order to provide a case that becomes permeable to propellant and/or gas-generant combustion gases below the auto-ignition temperature but above the ambient temperature (which can range from about 0–165° F.), it is preferred that the matrix material soften at a temperature of from about 260° F. to about 320° F. More preferably, the matrix material should soften at a temperature of from about 300 to 320° F. It is noted that by the use of higher melting point fibers, i.e., those melting at temperatures higher than, for example, polyolefins (e.g., melting point of about 200–300° F.), dimensional stability of the case is maintained even when the matrix has softened.

Suitable matrix materials for use in conjunction with the present invention are those which provide a softening temperature which is intermediate between ambient temperature and the auto-ignition temperature of a propellant and/or gas generant. Further, a suitable matrix material is one which in combination with the fiber(s) previously described form a case having sufficient dimensional stability for propellant or gas-generant applications without substantial reliance on metals and other such materials that yield shrapnel upon explosion especially in the barrel section of the case. See, for example, barrel section 300 of FIG. 6.

The matrix material must also be capable of maintaining the normally expected yield strength of the fiber. For example, graphite wound fibers have a yield strength of about 275,000 psi. For comparison, 4340 steels has a yield strength (in tension) of about 174,000 psi. Titanium alloys have yield strength of about 145,000 psi. Aluminum alloys have a yield strength of about 53,000 psi. Polypropylene fibers have a yield strength of about 8,000 psi. Wound glass fibers have a yield strength of about 150,000 psi. These yield strengths are listed in Mil-HBK-5, published by the Government Printing Office and well known to those of ordinary skill in this art, which is incorporated herein by reference in its entirety. Further, these yield strengths are representative and can vary by at least 100% depending upon grade and processing conditions, etc. which are well recognized in the art. The most demanding fiber is high grade modular graphite. It is preferred that the matrix material when encased around a fiber and cured according to the present invention should provide a yield strength of at least about 300,000 psi.

Typically, the matrix material is comprised of at least two components, at least one resin material and a curative agent which are combined to form the matrix. Both the resin(s) and the curative agent should preferably have substantially low viscosity and, preferably, substantially the same viscosity at room temperature for greater ease of mixing and use, especially, in continuous processing equipment. Examples of such components, include but are not limited to, Epon® 828 as the resin and Versamid® 125, Versamid® 140, and Versamid® 115 or mixtures thereof as the curative agent.

Epon® 828 is an example of an epoxy resin available from Shell Chemical Company which has a viscosity from 110–150 poises at about 25° C. Versamid® 115, 125 and 140 are examples of polyamide curative agents available from Henkel Corporation. Versamid® 115, 125 and 140 have viscosities from about 28–42 poise, from about 6.5–9.5 poise and from about 68–164 poise, respectively, at about 25° C. Other epoxy resins and polyamide curative agents are known to those skilled in the art and may be used with the present invention.

To form the matrix material, for example, the Epon® 828 is mixed with Versamid® 125 in a percent by weight ratio from about 1:1 to about 3:1. Unless indicated otherwise, all percentages are percents by weight based on the total weight of the matrix material. Thus, for example, one embodiment could comprise 75±2% of an epoxy resin mixed with 25±2% of a polyamide to provide a suitable matrix material.

After formation by mixing the resin and curative agent components and after being applied to one or more fibers, for example, by spraying or by immersing the fiber in a matrix bath, it is preferred that the encased fiber be stored under refrigeration for a period of at least about 6-months in a state of $\beta$-cure, that is, in a partially cured state. This allows mass production of encased fibers at a minimum cost which can be stored for up to six months for future use.

Encasing the fibers in the matrix material may be accomplished, for example, by spraying the matrix material onto the fibers or by immersing the fibers in a matrix bath containing the matrix material or by other methods known in the art. However, immersing the fiber in a matrix bath containing the matrix material is preferred for forming high quality cases therefrom.

It is important that nearly all or, preferably, all fiber surfaces be encased in the matrix material sufficient to fill all the interstitial spaces between adjacent fibers upon winding on, for example, a mandrel or a shaped body. There should be no areas in the interstices of the winding that are not substantially filled with the matrix material. The matrix material should remain in a state of $\beta$-cure until the winding operation is completed.

Mandrel 17 of FIGS. 1 and 9 or the shaped body 19 of FIGS. 2, 4–7 and 10 may optionally be wrapped with a mold release layer, a barrier layer and/or an insulation layer upon which the encased fiber is wound. For example, referring to FIG. 5, a cross section of case 10 so made depicts an optional external abrasion protective layer 110, a layer 100 of cured, encased wound fibers 4, an optional layer 8 which may be an insulation layer, a mold release layer, a barrier layer or some combination thereof, the propellant or gas-generant layer 19 and an optional cavity 1.

Figure 6:
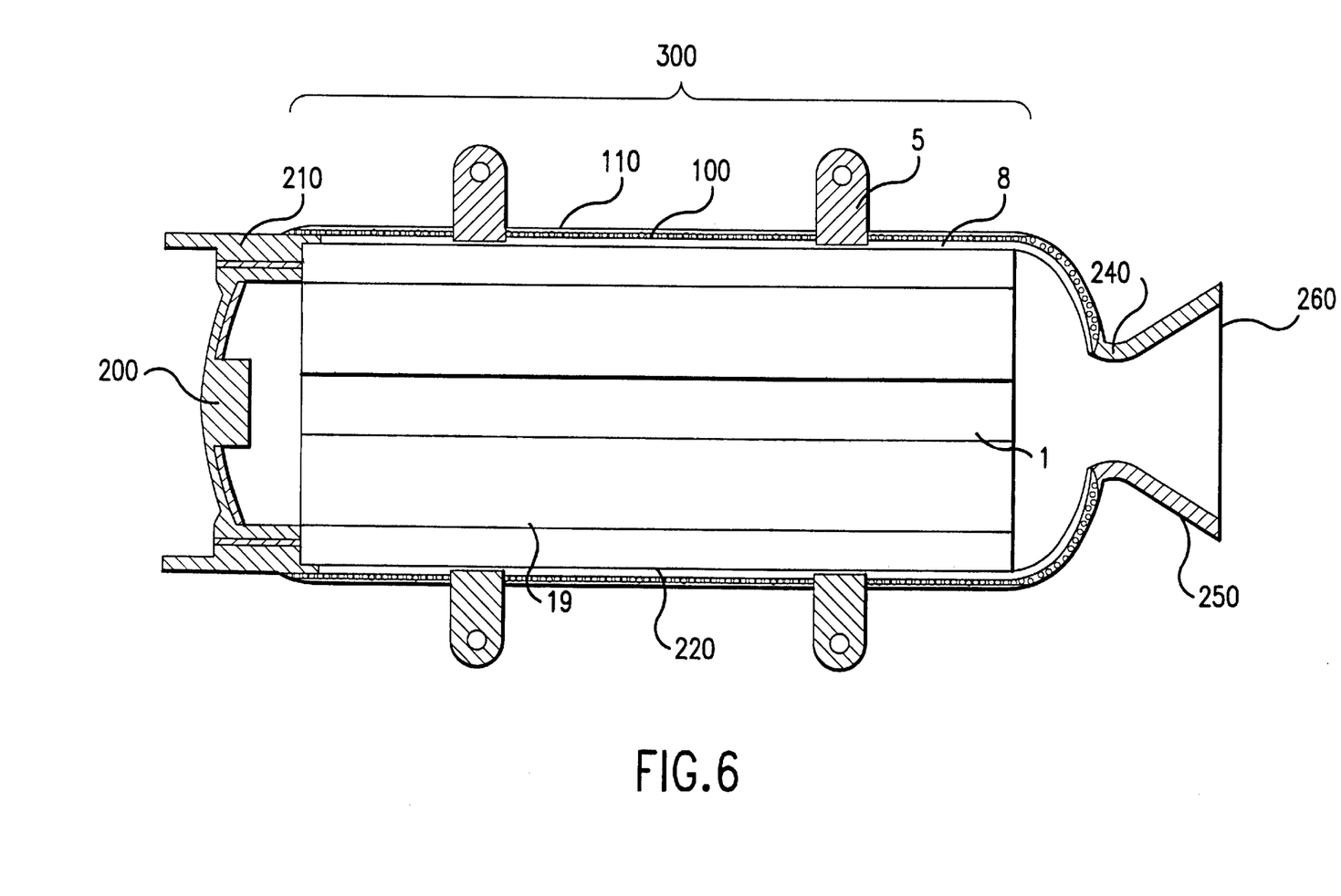
FIG. 6 is a sectional view of another embodiment of a case made in accordance with the present invention.

Referring to FIG. 6, an example of an alternate embodiment of the case is depicted. Therein, a mechanically attached closure 200 and optional ignitor (not shown) is mounted via an optional attachment skirt 210. An optional external abrasion protective layer 110, a layer 100 of encased and wound fibers 4, an optional layer 8 which may be an insulation layer, a mold release layer, a barrier layer or some combination thereof, an optional internal cavity 220, a propellant layer 19, an optional cavity 1, optional fitting attachments 5, a nozzle support 240, a nozzle 250 and nozzle outlet 260 are depicted. It is noted that when optional layers 8 and 110 are used, such layers should have at least substantially overlapping permeability or, preferably, the same permeability to combustion gases as layer 100. Otherwise, the case will fail to provide the safety benefits of the present invention.

In order that the case made according to the present invention meet Insensitive Munitions requirements (i.e., see Chemical Propulsion Information Agency—CPIA/M2 Solid Propellant Manual which is well known to those of ordinary skill in this art), it is necessary that the case does not produce shrapnel in response to unplanned stimuli. Thus, the barrel section 300 should not contain substantial amounts of metal or preferably should not contain metal, alloys or the like as structural members for providing either hoop load and/or longitudinal load (i.e., for providing dimensional stability). Of course, metal as force take off skirts or as supports around openings or as attachment fittings cannot be avoided. However, the substantial or complete absence of metal, alloys or the like in the barrel section 300 of the case 10 reduces the potential for catastrophic damage should an explosion occur in response to unforeseen stimuli.

Once the encased fiber is wound around, for example, a shaped body 19, a mandrel 17 or the like, the case is then at least partially cured at least at ambient temperature (e.g., 25° C. or higher). For example, the wound case may be at least partially cured at a curing temperature from about 25° C. to about 100° C. for a period of time from about 1 to about 12 hours or more.

However, before or after partial curing, the wound case may be stored in a state of $\beta$-cure, under refrigeration, for a period up to about 6 months. The refrigeration temperature, for example, may be about 10° C. or lower, preferably, from about −25° C. to about 10° C. If, however, the case is not to be maintained in state of $\beta$-cure for an extended period of time, then the case is heated to a temperature above the softening point of the matrix material for a period of time sufficient to impart dimensional stability to the case. For example, the heating of the wound, encased and at least partially cured fibers may be accomplished by heating at a temperature range from about 260° F. to about 400° F. for about 4 to about 50 hours, more preferably at from about 325° F. to about 350° F. for at least about 12 hours (up to about 50 hours) and most preferably at about 325° F. for a period of time from about 12 to about 16 ours. Thereafter, the case is cooled and the mandrel, if any, is removed. Lastly, removal of any flashing or smoothing of rough surfaces by secondary machining may be carried out either immediately before or after cooling the heated case.

Having described the invention, the following example is provided to illustrate the best mode now known to practice the present invention. However, as will be readily understood by one of ordinary skill in the art, the example is only an illustration of the preferred embodiment of the present invention and is not intended to limit the scope of the present invention. As understood by one of ordinary skill, variations and modifications may be made within the scope of the present invention. The example provided is thus for illustrative purposes only.

EXAMPLES

Prophetic Example 1

Coat a graphite fiber with a matrix material mixture of 75±2% by weight of Epon® 828 and 25±2% by weight of Versamid® 125 as depicted in FIGS. 1, 9 or 10 or by spray drying. Thereafter, continuously wind the coated fiber on a mandrel or a shaped body at an angle Θ from about 75° to about 90° as depicted in FIG. 8 to form a wound case as depicted in either of FIGS. 2–7. Thereafter, at least partially cure the wound fibers at room temperature (e.g., about 25° C.) or with a heat lamp to 38° C. (100° F.) for a period from 1 to 12 hours. Then, heat the partially cured wound fibers at a temperature range from 325–350° F. for at least 12 hours in an oven. Next, remove the wound fibers from the oven and allow them to cool to ambient room temperature. Thereafter, remove the mandrel, if any, and remove any flashing or perform any secondary machining, if necessary to smooth out any rough surfaces. This procedure forms one embodiment of a case in accordance with the present invention.

What is claimed is:

1. A process for forming a dimensionally stable case for combustible materials, which process comprises:

associating a matrix material that has a preselected softening point with at least one fiber having a preselected melting point to form a coated fiber, with the preselected softening point of the matrix material being lower than the preselected melting point of the fiber;

arranging the coated fiber to form at least one layer of fiber and matrix material in a desired shape of the case, with the layer defining an interior cavity for receiving combustible material;

at least partially thermally curing the matrix material of the layer;

subsequently heating the at least partially cured layer to a heating temperature above the softening point of the matrix material for a heating time sufficient to impart dimensional stability to the layer so that the layer can maintain the desired shape of the casing while supporting and retaining combustible material therein, wherein the softening point of the matrix material is lower than an auto-ignition temperature of a combustible material that is to be placed in the cavity; and cooling the heated layer to obtain the case.

2. The process of claim 1 which further comprises selecting said heating time to be from about 4 hours to about 50 hours and selecting said matrix material to have said softening point of at least about 260° F. which is at least 2 degrees lower than said heating temperature.

3. The process of claim 2 which further comprises selecting said heating time to be at least about 12 hours and selecting said matrix material to have said softening point from about 260° F. to about 320° F.

4. The process of claim 3 which further comprises selecting said heating temperature to be from about 325° F. to about 350° F. and selecting said matrix material to have said softening point of from about 300° F. to about 320° F.

5. The process of claim 4 which further comprises selecting said softening point of the matrix material to be lower than said melting point said fiber by at least 100° F.

6. The process of claim 1 which further comprises utilizing at least two different fibers for associating with said matrix material.

7. The process of claim 1 wherein said associating step comprises spray drying said fiber with said matrix material to form said coated fiber.

8. The process of claim 1 wherein said associating step comprises dipping said fiber into said matrix material to form said coated fiber.

9. The process of claim 1 wherein said arranging step comprises winding said fiber to provide at least one hoop layer of substantially parallel aligned rows of said fiber and at least one longitudinal layer of substantially parallel aligned rows of said fiber, said rows of said hoop layer being at an angle Θ to said rows of said longitudinal layer.

10. The process of claim 1 wherein said arranging step comprises winding said fiber to provide at least two hoop layers of substantially parallel aligned rows of said fiber and at least one longitudinal layer of substantially parallel aligned rows of said fiber, said rows of said hoop layers being at an angle Θ to said rows of said longitudinal layer.

11. The process of claim 1 further comprising the step of providing said combustible material within said interior cavity.

12. The process of claim 11 further comprising the step of interposing an intermediate insulating layer between said combustible material and said layer of said fiber and said matrix material, wherein said insulating layer has a softening point below said auto-ignition temperature and below said melting point of said fiber.

13. The process of claim 11 wherein said curing step comprises maintaining said matrix material at a curing temperature from about 25° C. to about 100° C. for about 1 to about 12 hours and wherein said process further comprises selecting said combustible material to have an auto-ignition temperature of at least about 320° F.

14. The process of claim 1 wherein said arranging step comprises winding the coated fiber around a mandrel or a shaped body.

15. The process of claim 14 wherein said coated fiber is fed to a delivery head prior to said winding step and wherein, during said winding, the delivery head or the mandrel is oscillated in any desired direction to wind said coated fiber at any desired angle over said mandrel.

16. The process of claim 14 wherein the coated fiber is wound around the shaped body and which further comprises oscillating said shaped body along a rod during the winding step.

17. The process of claim 16 wherein said shaped body is an inflatable balloon which is at least partially inflated during said winding step and which is deflated and withdrawn from said case after completion of said arranging step.

18. The process of claim 14 which further comprises selecting, as said shaped body, a solid combustible material.

19. The process of claim 16 which further comprises at least partially surrounding said combustible material with one or more layers selected from liner layers and mold release layers interposed between the combustible material and the case.

20. The process of claim 1 which further comprises adding an external abrasion protection layer to an outer surface of said case.

21. The method of claim 1 which further comprises storing said coated fiber, prior to said arranging step, at a temperature of less than about 10° C. for up to about 6 months in a partially cured state.

22. The method of claim 1 which further comprises selecting said fibers to have a melting point of greater than about 300° F.

23. A process for forming a dimensionally stable case for combustible materials, said process comprising:

associating a matrix material that has a preselected softening point with at least one fiber having a melting point greater than about 300° F. to form a coated fiber, wherein the preselected softening point of the matrix material is lower than the melting point of the fiber;

winding the coated fiber around a mandrel or a shaped body to form at least one layer of fiber and matrix material in a desired shape of the case, with the layer defining an interior cavity for receiving combustible material;

at least partially thermally curing the matrix material of the layer;

subsequently heating the at least partially cured layer to a temperature above the softening point of the matrix material for a heating time sufficient to impart dimensional stability to the layer so that the layer can maintain the desired shape of the case while supporting and maintaining a combustible material therein, wherein the softening point of the matrix material is lower than an auto-ignition temperature of a combustible material that is to be placed in the cavity; and cooling the heated layer to obtain said case.

24. The process of claim 23 further comprising the step of providing combustible material within said interior cavity.

25. The process of claim 24 which further comprises at least partially surrounding said combustible material with one or more layers selected from liner layers and mold release layers interposed between the combustible material and the case.

26. A process for forming a dimensionally stable case for combustible materials, which process comprises:

associating a matrix material that has a preselected softening point with at least one fiber having a melting point greater than about 300° F. to form a coated fiber, with the preselected softening point of the matrix material being lower than the melting point of the fiber;

arranging the coated fiber around a shaped body formed of a combustible material to form at least one layer of fiber and matrix material in a desired shape around said shaped body;

at least partially thermally curing the matrix material of the layer;

subsequently heating the at least partially cured layer to a temperature above the softening point of the matrix material for a heating time sufficient to impart dimensional stability to the layer so that the layer can maintain the desired shape of said case while supporting and maintaining the combustible material therein, wherein the softening point of the matrix material is lower than an auto-ignition temperature of the combustible material; and cooling the heated layer to obtain said case.

27. The process of claim 26 which further comprises at least partially surrounding said combustible material with one or more layers selected from liner layers and mold release layers interposed between the combustible material and the case.

* * * * *